United States Patent
Davenport et al.

(10) Patent No.: US 11,664,518 B2
(45) Date of Patent: May 30, 2023

(54) ALKALINE MANGANESE REDOX FLOW BATTERY WITH INHIBITOR

(71) Applicant: RAYTHEON TECHNOLOGIES CORPORATION, Farmington, CT (US)

(72) Inventors: Timothy Davenport, South Windsor, CT (US); James D. Saraidaridis, Hartford, CT (US); Robert Mason Darling, South Windsor, CT (US)

(73) Assignee: RAYTHEON TECHNOLOGIES CORPORATION, Arlington, VA (US)

( * ) Notice: Subject to any disclaimer, the term of this patent is extended or adjusted under 35 U.S.C. 154(b) by 0 days.

(21) Appl. No.: 17/326,518

(22) Filed: May 21, 2021

(65) Prior Publication Data

US 2022/0376286 A1 Nov. 24, 2022

(51) Int. Cl.
*H01M 8/18* (2006.01)

(52) U.S. Cl.
CPC .... *H01M 8/188* (2013.01); *H01M 2300/0014* (2013.01)

(58) Field of Classification Search
CPC ............ H01M 8/188; H01M 2300/0014
See application file for complete search history.

(56) References Cited

U.S. PATENT DOCUMENTS

| | | | |
|---|---|---|---|
| 4,552,665 A | 11/1985 | Ralston et al. | |
| 5,182,028 A | 1/1993 | Boffardi et al. | |
| 9,853,310 B2 * | 12/2017 | Darling | H01M 8/0432 |
| 2012/0045680 A1 * | 2/2012 | Dong | H01M 8/04186 429/105 |
| 2013/0004819 A1 * | 1/2013 | Mun | H01M 8/188 429/106 |
| 2014/0302423 A1 * | 10/2014 | Darling | H01M 8/20 429/498 |
| 2015/0214565 A1 * | 7/2015 | Deguchi | H01M 4/604 429/105 |
| 2016/0181640 A1 * | 6/2016 | Kaku | H01M 8/08 429/498 |
| 2020/0006796 A1 | 1/2020 | Su et al. | |

OTHER PUBLICATIONS

Colli et. al. Chem. Commun., 2016, 52 (Year: 2016).*
The use of phosphates for potable water treatment. The Phosphate Forum of the Americas. Retrieved from: https://phosphatesfacts.org/wp-content/uploads/2015/09/The-Use-of-Phosphates-For-Potable-Water-Treatment.pdf.

* cited by examiner

*Primary Examiner* — Alexander Usyatinsky
(74) *Attorney, Agent, or Firm* — Carlson, Gaskey & Olds, P.C.

(57) ABSTRACT

A redox flow battery includes a redox flow cell and a supply and storage system external of the redox flow cell. The supply and storage system includes first and second electrolytes for circulation through the redox flow cell. The first electrolyte is a liquid electrolyte having electrochemically active manganese species with multiple, reversible oxidation states in the redox flow cell. The electrochemically active manganese species may undergo reactions that cause precipitation of manganese oxide solids. The first electrolyte includes an inhibitor that limits the self-discharge reactions. The inhibitor includes an oxoanion compound.

14 Claims, 1 Drawing Sheet

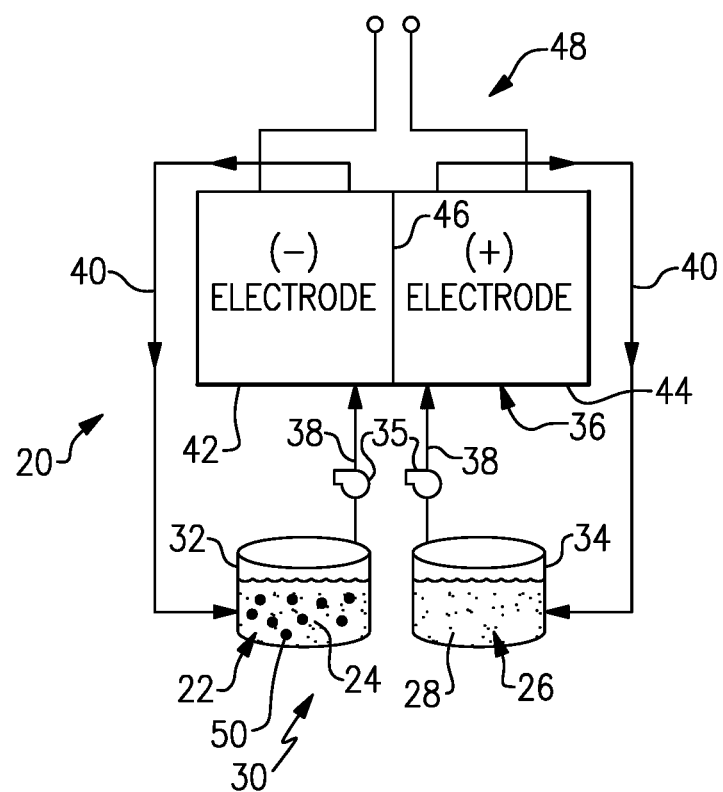

ALKALINE MANGANESE REDOX FLOW BATTERY WITH INHIBITOR

STATEMENT OF GOVERNMENT RIGHTS

This disclosure was made with government support under Contract No. DE-AR0000994 awarded by the Department of Energy. The government has certain rights in the disclosure.

BACKGROUND

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A typical flow battery includes a redox flow cell that has a negative electrode and a positive electrode separated by an electrolyte layer, which may include a separator, such as an ion-exchange membrane. A negative fluid electrolyte (sometimes referred to as the anolyte) is delivered to the negative electrode and a positive fluid electrolyte (sometimes referred to as the catholyte) is delivered to the positive electrode to drive reversible redox reactions between redox pairs. Upon charging, the electrical energy supplied causes a reduction reaction in one electrolyte and an oxidation reaction in the other electrolyte. The separator prevents the electrolytes from freely and rapidly mixing but permits selected ions to pass through to complete the redox reactions. Upon discharge, the chemical energy contained in the liquid electrolytes is released in the reverse reactions and electrical energy can be drawn from the electrodes.

SUMMARY

A redox flow battery according to an example of the present disclosure includes a redox flow cell and a supply and storage system external of the redox flow cell. The supply and storage system includes first and second electrolytes for circulation through the redox flow cell. The first electrolyte is a liquid electrolyte having electrochemically active manganese species with multiple, reversible oxidation states in the redox flow cell. The electrochemically active manganese species can undergo reactions that cause precipitation of manganese oxide solids. The first electrolyte further includes an inhibitor limiting the self-discharge reactions, and the inhibitor includes an oxoanion compound.

In a further embodiment of any of the foregoing embodiments, the inhibitor is selected from the group consisting of phosphates ($PO_4^{3-}$), nitrates ($NO_3^-$), and sulfates ($SO_4^{2-}$), or any compound that decomposes in the electrolytes to form phosphate, nitrate, or sulfate species, and mixtures thereof.

In a further embodiment of any of the foregoing embodiments, the inhibitor is selected from the group consisting of phosphates and mixtures thereof.

In a further embodiment of any of the foregoing embodiments, the inhibitor is selected from the group consisting of nitrates and mixtures thereof.

In a further embodiment of any of the foregoing embodiments, the inhibitor is selected from the group consisting of sulfates, and mixtures thereof.

In a further embodiment of any of the foregoing embodiments, the inhibitor is a compound that decomposes during operation of the redox flow battery to generate phosphate, nitrate, or sulfate species in solution.

In a further embodiment of any of the foregoing embodiments, the first electrolyte has a composition in which there is from 0.0001 mol to 0.1 mol of inhibitor per 1 mol of manganese ions.

In a further embodiment of any of the foregoing embodiments, the first electrolyte has a composition in which there is from 0.001 mol to 0.01 mol of inhibitor per 1 mol of manganate.

In a further embodiment of any of the foregoing embodiments, the electrochemically active manganese species are $MnO_4^-$ and $MnO_4^{2-}$.

An electrolyte for a redox flow battery according to an example of the present disclosure includes a supporting electrolyte including a solvent and a supporting salt, and electrochemically active manganese species dissolved in the supporting electrolyte. The electrochemically active manganese species has multiple, reversible oxidation states in the supporting electrolyte. An inhibitor is dissolved in the supporting electrolyte and limits reactions of the electrochemically active manganese species that cause precipitation of manganese oxide solids. The inhibitor includes an oxoanion compound.

In a further embodiment of any of the foregoing embodiments, the inhibitor is selected from the group consisting of phosphates ($PO_4^{3-}$), nitrates ($NO_3^-$), and sulfates ($SO_4^{2-}$), or any compound that decomposes in the electrolytes to form phosphate, nitrate, or sulfate species, and mixtures thereof.

In a further embodiment of any of the foregoing embodiments, the inhibitor is selected from the group consisting of phosphates and mixtures thereof.

In a further embodiment of any of the foregoing embodiments, the inhibitor is selected from the group consisting of nitrates and mixtures thereof.

In a further embodiment of any of the foregoing embodiments, the inhibitor is selected from the group consisting of sulfates and mixtures thereof.

In a further embodiment of any of the foregoing embodiments, the inhibitor is a compound that decomposes in the electrolyte to generate phosphate, nitrate, or sulfate species in solution.

A further embodiment of any of the foregoing embodiments includes a composition in which there is from 0.0001 mol to 0.1 mol of inhibitor per 1 mol of manganate.

In a further embodiment of any of the foregoing embodiments, the electrochemically active manganese species are $MnO_4^-$ and $MnO_4^{2-}$.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 1 illustrates an example of a redox flow battery.

DETAILED DESCRIPTION

FIG. 1 schematically shows portions of an example redox flow battery 20 for selectively storing and discharging electrical energy. As an example, the flow battery 20 can be used to convert electrical energy generated in a renewable energy system to chemical energy that is stored until a later time when there is greater demand, at which time the flow battery 20 can be used to convert the chemical energy back into electrical energy. The flow battery 20 can supply the electric energy to an electric grid, for example.

The flow battery 20 includes a first electrolyte 22 that has electrochemically active species 24 that function as a redox pair with regard to an additional second electrolyte 26 that has at electrochemically active species 28. At least the first electrolyte 22 is a liquid, but the second electrolyte 26 is most typically also a liquid. The electrolytes 22/26 are contained in a supply/storage system 30 that includes first and second vessels 32, 34.

For example, the electrochemically active species 24 are based on manganese oxyanions, namely $MnO_4^-$ and $MnO_4^{2-}$ that have oxidation states of +6 and +7 respectfully. The manganese in the oxyanions have multiple, reversible oxidation states in a selected liquid solution, i.e., in a supporting electrolyte, such as, but not limited to, aqueous solutions of basic salts. The electrochemically active species 28 of the second electrolyte 26 is not particularly limited. For example, the electrochemically active species 28 is selected from vanadium, iron, chromium, zinc, molybdenum, sulfur, cerium, lead, tin, titanium, germanium, and combinations thereof, halogens, such as bromine, chlorine, and combinations thereof, or organic molecules that contain groups that undergo electrochemically reversible reactions, such as quinones or nitrogen-containing organics such as quinoxalines or pyrazines or sulfur-containing organics such as phenothiazine.

As an example, the half-cell reactions for a manganese/sulfur system are shown below. These reactions, as well as those of other systems, are well known and therefore not discussed further.

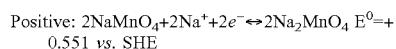

Positive: $2NaMnO_4+2Na^++2e^- \leftrightarrow 2Na_2MnO_4$ $E^0=+0.551$ vs. SHE

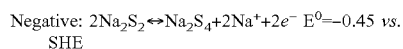

Negative: $2Na_2S_2 \leftrightarrow Na_2S_4+2Na^++2e^-$ $E^0=-0.45$ vs. SHE

The electrolytes 22, 26 are circulated by pumps 35 to at least one redox flow cell 36 of the flow battery 20 through respective feed lines 38, and are returned from the cell 36 to the vessels 32, 34 via return lines 40. As can be appreciated, additional pumps 35 can be used if needed, as well as valves (not shown) at the inlets/outlets of the components of the flow battery 20 to control flow. Multiple cells 36 can be provided as a stack within the loops of the flow circuit.

The cell or cells 36 each include the first electrode 42, a second electrode 44 spaced apart from the first electrode 42, and an electrolyte separator layer 46 arranged between the first electrode 42 and the second electrode 44. For example, the electrodes 42, 44 are porous carbon structures, such as carbon paper or felt. In general, the cell or cells 36 can include bipolar plates, manifolds and the like for delivering the electrolytes 22, 26 through flow field channels to the electrodes 42, 44. It is to be understood however, that other configurations can be used. For example, the cell or cells 36 can alternatively be configured for flow-through operation where the fluid electrolytes 22, 26 are pumped directly into the electrodes 42, 44 without the use of flow field channels.

The electrolyte separator layer 46 can be, but is not limited to, an ionic-exchange membrane, a micro-porous polymer membrane, or an electrically insulating microporous matrix of a material, such as silicon carbide (SiC), that prevents the fluid electrolytes 22, 26 from freely and rapidly mixing but permits selected ions to pass through to complete the redox reactions while electrically isolating the electrodes 42, 44. In this regard, the flow circuits of the electrolytes 22/26 are isolated from each other during normal operation, such as charge, discharge, and shutdown states.

The electrolytes 22, 26 are delivered to, and circulate through, the cell or cells 36 during an active charge/discharge mode to either convert electrical energy into chemical energy or, in the reverse reaction, convert chemical energy into electrical energy that is discharged. The electrical energy is transmitted to and from the cell or cells 36 through an electric circuit 48 that is electrically coupled with the electrodes 42, 44.

The flow battery 20 can also be transitioned from the active charge/discharge mode to a fully shutdown mode in which neither of the electrolytes 22, 26 are circulated through the cells 36. For example, in the fully shutdown mode, the electrolytes 22, 26 are either emptied from the cells 36 or are left in the cells 36 but not circulated. In this regard, the flow battery 20 may also include a controller that has hardware, such as a microprocessor, software, or both that are configured to control the operation of the flow battery 20, including shutdown from the active charge/discharge mode and start-up from the inactive shutdown mode.

At high pH levels, such as a pH of approximately 14 or greater, the manganese species in the electrolyte 22, particularly those in which manganese has the oxidation states of +6 and +7, are prone to reactions that cause precipitation of manganese oxide solids. Without wishing to be bound by any particular theory, it is hypothesized that the manganese of oxidation states of +6 and +7 participate in the self-discharge, disproportion, and/or decomposition reactions shown below to yield $MnO_2$ solid precipitate. The manganese oxide precipitate has low solubility in the electrolyte and the reactions thus effectively serve as a removal mechanism of the electrochemically active permanganate or manganate from the electrolyte. Moreover, as precipitation can occur over the matter of only a few days, the effective removal of the manganese by precipitation represents a durability debit and thus an obstacle to realization of other performance and cost benefits that make manganese electrolytes attractive.

Permanganate/Manganate Reactions:

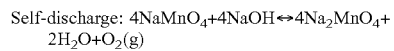

Self-discharge: $4NaMnO_4+4NaOH \leftrightarrow 4Na_2MnO_4+2H_2O+O_2(g)$

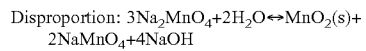

Disproportion: $3Na_2MnO_4+2H_2O \leftrightarrow MnO_2(s)+2NaMnO_4+4NaOH$

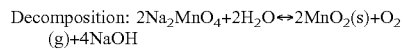

Decomposition: $2Na_2MnO_4+2H_2O \leftrightarrow 2MnO_2(s)+O_2(g)+4NaOH$

In this regard, in order to limit such reactions of manganese of oxidation states of +6 and +7, and thereby enhance durability of the flow battery 20, the electrolyte 22 includes an inhibitor 50. The inhibitor 50 hinders the reactions and thus impedes formation of the manganese oxide precipitate from the manganese of oxidation states +6 and +7. Again, without wishing to be bound by any particular theory, it is hypothesized that these manganese ions react to form clustered manganese oxide complexes of $Mn_xO_y^z$ and that these clusters then catalyze further reaction of manganate by one or both of two mechanisms. One mechanism is thought to be a catalysis for oxygen evolution by the clusters, and the other mechanism is thought to be growth of the clusters and accompanying driving of the disproportionation and decomposition reactions. Under these concepts, the inhibitor 50 serves to strongly bind to the clusters, thereby blocking catalysis reaction sites for oxygen evolution and/or cluster growth.

The inhibitor 50 includes an oxoanion compound. An oxoanion, also termed an oxyanion, is an ion with the generic formula $A_xO^{z-}_y$, where A is a chemical element and O is an oxygen atom. For example, the inhibitor 50 is selected from the group consisting of phosphates ($PO_4^{3-}$), nitrates ($NO_3^-$), and sulfates ($SO_4^{2-}$), or any compound that decomposes in the electrolytes to form phosphate, nitrate, or sulfate species, and mixtures thereof.

In general, the electrolyte 22 has a composition in which there is from 0.0001 mol to 0.1 mol of the inhibitor 50 per every 1 mol of manganate. Amounts at the lower end of this range may be used for relatively lower inhibiting effects, while amounts at the upper end of this range may be used for relatively higher inhibiting effects. In a further example, there is from 0.001 mol to 0.01 mol of inhibitor per 1 mol of manganese.

As a further example, the electrolyte 22 has a composition:
- 75 wt % of supporting electrolyte including 66 wt % of a solvent and 9 wt % of a supporting salt,
- 25 wt % of the electrochemically active manganese species dissolved in the supporting electrolyte, and
- <1 wt % of the inhibitor 50 dissolved in the supporting electrolyte.

Further non-limiting examples of inhibitors 50 for use in the amounts above are shown in the table below.

TABLE

Example Inhibitors

| Class | Inhibitor |
|---|---|
| Nitrates | Potassium nitrate |
| | Sodium nitrate |
| | Ammonium nitrate |
| | Manganese(II) nitrate |
| Phosphates | Potassium phosphate |
| | Potassium dihydrogen phosphate |
| | Sodium phosphate |
| | Manganese(II) phosphate |
| Sulfates | Potassium sulfate |
| | Sodium sulfate |
| | Potassium bisulfate |
| | Manganese(II) sulfate |

Although a combination of features is shown in the illustrated examples, not all of them need to be combined to realize the benefits of various embodiments of this disclosure. In other words, a system designed according to an embodiment of this disclosure will not necessarily include all of the features shown in any one of the FIGURES or all of the portions schematically shown in the FIGURES. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A redox flow battery comprising:
a redox flow cell; a supply and storage system external of the redox flow cell, the supply and storage system including first and second electrolytes for circulation through the redox flow cell, the first electrolyte is a liquid electrolyte solution of a pH of 14 or greater, the liquid electrolyte solution having dissolved electrochemically active manganese species with multiple, reversible oxidation states in the redox flow cell, wherein the electrochemically active manganese species can undergo reactions that cause precipitation of manganese oxide solids; and
the first electrolyte solution further including an inhibitor limiting the reactions, the inhibitor including an oxoanion compound,
wherein the inhibitor is selected from the group consisting of phosphates ($PO_4^-$), nitrates ($NO_3^-$), sulfates ($SO_4^-$) and mixtures thereof.

2. The electrolyte as recited in claim 1, wherein the inhibitor is selected from the group consisting of phosphates.

3. The electrolyte as recited in claim 1, wherein the inhibitor is selected from the group consisting of nitrates.

4. The electrolyte as recited in claim 1, wherein the inhibitor is selected from the group consisting of sulfates.

5. The electrolyte as recited in claim 1, having a composition in which there is from 0.0001 mol to 0.1 mol of inhibitor per 1 mol of manganate.

6. The redox flow battery as recited in claim 5, wherein the first electrolyte solution has a composition in which there is from 0.001 mol to 0.01 mol of inhibitor per 1 mol of manganate.

7. The redox flow battery as recited in claim 1, wherein the electrochemically active manganese species are $MnO_4^-$ and $MnO_4^{2-}$.

8. An electrolyte for a redox flow battery, comprising: a supporting electrolyte including a solvent and a supporting salt, the supporting electrolyte having a pH of 14 or greater;
electrochemically active manganese species dissolved in the supporting electrolyte, the electrochemically active manganese species having multiple, reversible oxidation states in the supporting electrolyte; and
an inhibitor dissolved in the supporting electrolyte and limiting reactions of the electrochemically active manganese species that cause precipitation of manganese oxide solids, the inhibitor including an oxoanion compound,
wherein the inhibitor is selected from the group consisting of phosphates ($PO_4^-$), nitrates ($NO_3^-$), sulfates ($SO_4^-$) and mixtures thereof.

9. The electrolyte as recited in claim 8, wherein the inhibitor is selected from the group consisting of phosphates.

10. The electrolyte as recited in claim 8, wherein the inhibitor is selected from the group consisting of nitrates.

11. The electrolyte as recited in claim 8, wherein the inhibitor is selected from the group consisting of sulfates.

12. The electrolyte as recited in claim 8, having a composition in which there is from 0.0001 mol to 0.1 mol of inhibitor per 1 mol of manganate.

13. The electrolyte as recited in claim 10, wherein the electrochemically active manganese species are $MnO_4^-$ and $MnO_4^{2-}$.

14. The redox flow battery as recited in claim 1, wherein the inhibitor is selected from the group consisting of phosphates ($PO_4^{3-}$), nitrates ($NO_3^-$), sulfates ($SO_4^{2-}$), and mixtures thereof, the first electrolyte solution has a composition in which there is from 0.0001 mol to 0.1 mol of inhibitor per 1 mol of manganese ions, and the electrochemically active manganese species are $MnO_4^-$ and $MnO_4^{2-}$.

* * * * *

UNITED STATES PATENT AND TRADEMARK OFFICE
CERTIFICATE OF CORRECTION

| | | Page 1 of 1 |
|---|---|---|
| PATENT NO. | : 11,664,518 B2 | |
| APPLICATION NO. | : 17/326518 | |
| DATED | : May 30, 2023 | |
| INVENTOR(S) | : Davenport et al. | |

It is certified that error appears in the above-identified patent and that said Letters Patent is hereby corrected as shown below:

In the Claims

Claim 2, Column 6, Line 15, change "electrolyte" to --redox flow battery--.

Claim 3, Column 6, Line 18, change "electrolyte" to --redox flow battery--.

Claim 4, Column 6, Line 20, change "electrolyte" to --redox flow battery--.

Claim 5, Column 6, Line 22, change "electrolyte" to --redox flow battery--.

Signed and Sealed this
Twenty-seventh Day of June, 2023

Katherine Kelly Vidal
*Director of the United States Patent and Trademark Office*